United States Patent
Crook et al.

(10) Patent No.: US 8,809,679 B1
(45) Date of Patent: Aug. 19, 2014

(54) CRYOGENIC HEAT SINK FOR GAS COOLED SUPERCONDUCTING POWER DEVICES

(71) Applicant: The Flordia State University Research Foundation, Inc., Tallahassee, FL (US)

(72) Inventors: Danny G. Crook, Tallahassee, FL (US); Lukas Graber, Tallahassee, FL (US); Sastry Pamidi, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 14/041,573

(22) Filed: Sep. 30, 2013

Related U.S. Application Data

(63) Continuation-in-part of application No. 13/890,816, filed on May 9, 2013.

(60) Provisional application No. 61/657,567, filed on Sep. 6, 2012.

(51) Int. Cl.
*H01B 12/00* (2006.01)

(52) U.S. Cl.
USPC ....... 174/15.4; 174/15.1; 174/15.5; 174/16.1; 174/16.3; 165/165; 165/179; 165/164

(58) Field of Classification Search
CPC ............ H02G 3/03; H02G 3/04; H02G 5/06; H02G 5/063; H02G 5/10; H02G 15/34; H01B 12/00; H01B 12/02; H01B 12/16; H01B 12/12; H01F 6/04; H01F 6/065; H01R 4/68; F25J 2260/02; F25J 2260/00; Y02E 40/00; Y02E 40/06
See application file for complete search history.

(56) References Cited

U.S. PATENT DOCUMENTS

| | | | |
|---|---|---|---|
| 3,895,675 A * | 7/1975 | Rein et al. ..................... | 165/164 |
| 4,401,155 A * | 8/1983 | Royal et al. ................... | 165/166 |
| 6,854,276 B1 | 2/2005 | Yuan et al. | |
| 6,994,155 B2 * | 2/2006 | Dessiatoun et al. .......... | 165/165 |
| 7,748,102 B2 | 7/2010 | Manousiouthakis et al. | |
| 2003/0178184 A1 * | 9/2003 | Kroliczek et al. ....... | 165/104.26 |
| 2008/0119362 A1 * | 5/2008 | Ashibe et al. ................ | 505/211 |

OTHER PUBLICATIONS

Shimonosono et al., Development of a termination for the 77 kV-class high Tc superconducting power cable. IEEE Trans. Power Del. 1997. vol. 12 (No. 1): 33-38.

Masuda et al., Design and experimental results for Albany HTS cable. IEEE Trans. Appl. Supercond. 2005. vol. 15 (No. 2): 1806-1809.

(Continued)

*Primary Examiner* — Timothy Thompson
*Assistant Examiner* — Michael F McAllister
(74) *Attorney, Agent, or Firm* — Nilay J. Choksi; Smith & Hopen, P.A.

(57) ABSTRACT

A heat sink and method for gaseous cooling of superconducting power devices. Heat sink is formed of a solid material of high thermal conductivity and attached to the area needed to be cooled. Two channels are connected to the heat sink to allow an inlet and an outlet for cryogenic gaseous coolant. Inside the hollow heat sink are fins to increase metal surface in contact with the coolant. The coolant enters through the inlet tube, passes through the finned area inside the heat sink and exits through the outlet tube.

17 Claims, 17 Drawing Sheets

(56) References Cited

OTHER PUBLICATIONS

Maguire et al., Development and demonstration of a HTS power cable to operate in the long island power authority transmission grid. IEEE Trans. Appl. Supercond. 2007. vol. 17 (No. 2): 2034-2037.

Kephart et al., High temperature superconducting degaussing from feasibility study to fleet adoption. IEEE Trans. Appl. Supercond. 2011. vol. 21 (No. 3): 2229-2232.

Manivannan et al., Multiobjective optimization of flat plate heat sink using Taguchi-based Grey relational analysis. Int. J. Adv. Manuf. Technol. 2011. vol. 52: 739-749.

Park et al., Numerical shape optimization for high performance of a heat sink with pin-fins. Numer. Heat Transf. 2004. vol. 46 (Part A): 909-927.

Ledezma and Bejan, Heat sinks with sloped plate fins in natural and forced convection. Int. J. Heat Mass Transf. 1996. vol. 39 (No. 9): 1773-1783.

Graber et al., Cryogenic heat sink for helium gas cooled superconducting power devices. In Proc. COMSOL Conf., Boston, MA, USA, Oct. 3-5, 2012, pp. 1-10.

Arp et al., Thermophysical properties of helium-4 from 0.8 to 1500 K with pressures to 2000 MPa. NIST, Boulder, CO, USA, NIST Tech. Note 1334, 1998.

Pamidi et al., Cryogenic helium gas circulation system for advanced characterization of superconducting cables and other devices. Cryogenics. 2012. vol. 52: 315-320.

Rodrigo et al., Comparative study of high voltage bushing designs suitable for apparatus containing cryogenic helium gas. Cryogenics. 2013. http://dx.doi.org/10.1016/j.cryogenics.2013.04.002.

B. A. Hands and V. D. Arp, "A correlation of thermal conductivity data for helium," Cryogenics, vol. 21, No. 12, pp. 697-703, Dec. 1981.

F. P. Incropera and D. P. Dewitt, Fundamentals of Heat and Mass Transfer. Hoboken, NJ, USA: Wiley, pp. 470-471, 491, 496.

E. M. Dede, "Experimental investigation of the thermal performance of a manifold hierarchical microchannel cold plate," in Proc. ASME Conf., 2011, vol. 59, pp. 59-67.

COMSOL, Introduction to the Heat Transfer Module. COMSOL Version 4.3b. 2013: 1-36.

COMSOL, Multiphysics Model Library Manual. COMSOL Version 4.3b. 2013: 1-446.

COMSOL, Introduction to CFD Module. COMSOL Version 4.3b. 2013: 1-46.

COMSOL, CFD Module. COMSOL Version 4.3b. 2013: 1-316.

COMSOL, CFD Module User's Guide. COMSOL Version 4.3b. 2013. 1-618.

COMSOL, Introduction to COMSOL Multiphysics. COMSOL Version 4.3b. 2013: 1-148.

COMSOL, Heat Transfer Module Model Library Manual. COMSOL Version 4.3b.2013: 1-364.

COMSOL, COMSOL Multiphysics Reference Manual. COMSOL Version 4.3b. 2013 1-1664.

COMSOL, Heat Transfer Module User's Guide. COMSOL Version 4.3b. 2013: 1-338.

* cited by examiner

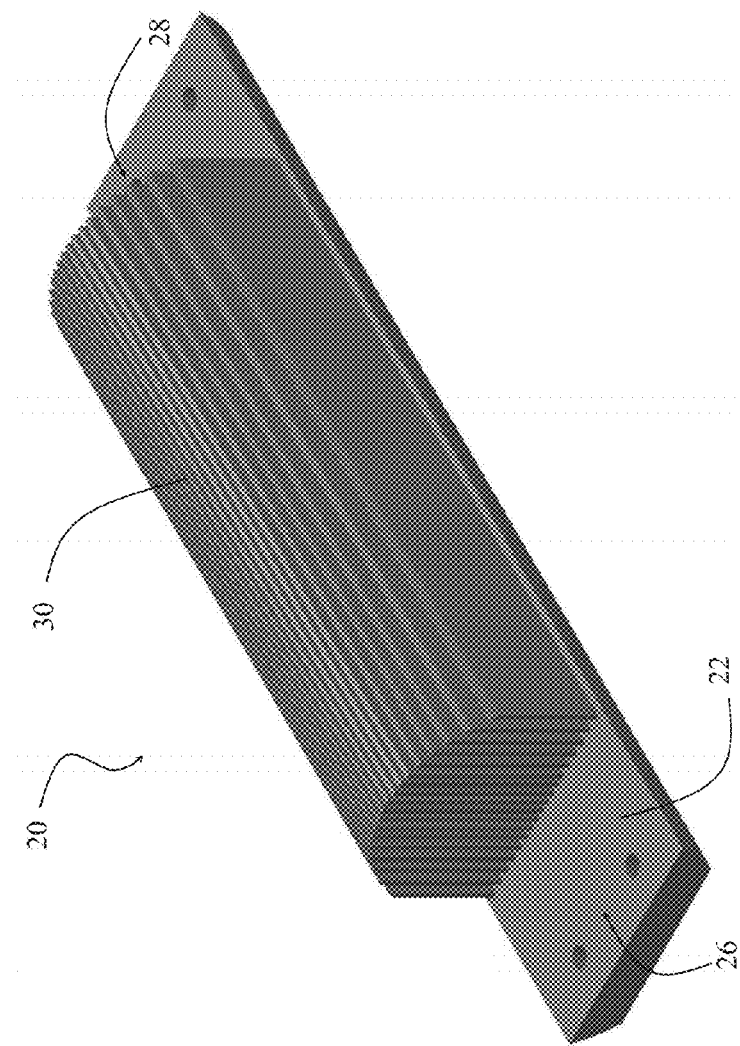

CRYOGENIC HEAT SINK FOR GAS COOLED SUPERCONDUCTING POWER DEVICES

CROSS-REFERENCE TO RELATED APPLICATIONS

This nonprovisional application is a continuation-in-part of and claims priority to U.S. nonprovisional application Ser. No. 13/890,816, entitled "Cable Termination for High Voltage Power Cables Cooled by a Gaseous Cryogen", filed May 9, 2013, which claims priority to provisional application No. 61/697,567, entitled "Cryogenic Heat Sink for Helium Gas Cooled Superconducting Power Devices", filed Sep. 6, 2012, both of which are incorporated herein by reference.

FEDERALLY SPONSORED RESEARCH OR DEVELOPMENT

This invention was made with Government support under Grant No. N00014-10-1-0984 awarded by the Office of Naval Research. The government has certain rights in the invention.

BACKGROUND OF THE INVENTION

1. Field of the Invention

This invention relates, generally, to cooling temperature superconducting power devices. More specifically, it relates to a cryogenic cooling system for superconductor (e.g., high temperature superconductor (HTS)) devices using a gaseous cryogen, for example helium, hydrogen, neon, other suitable pure element, or a gaseous mixture.

2. Brief Description of the Related Art

Power cables have terminations on each end to maintain dielectric integrity. Terminations interconnect the power cable with its high electric field to air-insulated components with lower electric fields and changing ambient conditions. In the case of a superconducting power cable, the terminations act as an interface between the cable and the grid and manage the thermal gradient from the cryogenic temperature components to the ambient temperature components. The terminations additionally need to link the cryogenic environment in the cable with the ambient temperature environment of the non-superconducting elements of the power system, such as copper cables, power transformers, circuit breakers, instrumentation transformers, and disconnect switches.

Superconducting power devices, such as cables, fault current limiters, or transfers, need feedthroughs that connect them with other elements of the power system that stay at ambient temperature. The higher temperatures of these components cause substantial heat influx into the terminations and consequently into the superconducting cable if no countermeasure is installed. It is very important to minimize the heat influx to maintain the operating temperature of the superconducting cable well below critical levels, as well as to minimize the installed cryogenic capacity and operating costs of the superconducting cable system. It must be ensured that the superconducting device remains at the designed operating cryogenic temperature in order to remain effective before, during, and after use. In many cases, when a superconducting device has a temperature of even one (1) Kelvin above the designed operating cryogenic temperature range, the device can quench and would subsequently fail to allow current to flow free of resistance, thus rendering ineffective the superconducting properties of the device.

The standard method of cooling for the cryogenic temperatures required for high temperature superconducting power devices is to use liquid nitrogen in its liquid temperature range of 63-77 K at standard pressure. This is common in High Temperature Superconducting (HTS) power systems [1]-[3]. Typically, the copper conductor and superconductor are positioned directly in the liquid coolant. In situations of forced cooling, fans are utilized, or for cryogenics, in particular, conduction cooling is performed using cryocoolers. However, these methodologies have several drawbacks for certain applications, for example shipboard power systems. One of the greatest disadvantages of this conventional technology is the use of liquid cryogens. In certain environments, liquid cryogens can pose potential unacceptable, unsafe asphyxiation hazards, as well as high pressure and explosion hazards associated with phase change. These disadvantages are described in [18]. Liquid cryogens also limit the temperature range of operation to the temperature at which the cryogen remains liquid.

There have been various attempts to improve upon previous methods of cooling superconducting devices. U.S. Pat. No. 6,854,276 B1 to Yuan et al. ("Yuan") discusses a method and apparatus of cryogenic cooling for high temperature superconductor devices. Yuan pressurizes liquid cryogen to above atmospheric pressure to improve its dielectric strength, while sub-cooling the liquid cryogen to below its saturation temperature. This method allows for cooling of high-voltage HTS materials without degrading the dielectric strength of liquid nitrogen. Despite the proposed advantages associated with the Yuan system, there are several disadvantages. The system fails to provide a very compact apparatus, and it lacks simple manufacturing and low manufacturing costs. Additionally, the apparatus is structured for liquid cryogens only, which has its own disadvantages, as discussed. This leads to a lack of maximum heat transfer/high efficiency coefficient.

As such, gaseous cryogens may be preferred to overcome the drawbacks of liquid cryogens. However, using only gaseous cryogens makes the cable more sensitive to heat influx since the heat capacity of gas cryogens typically is significantly inferior to or lower than the heat capacity of liquid cryogens. In other words, gaseous cryogens, by themselves, are insufficient to maintain a proper superconducting environment at and close to the terminations.

Another method of cooling high temperature superconducting material is discussed in U.S. Pat. No. 7,748,102 B2 to Manousiouthakis et al. ("Manousiouthakis"). Manousiouthakis provides an apparatus where HTS wire is surrounded by an inner layer of thermal insulator, a layer of high thermal conductivity material such as copper, and an outer layer of thermal insulator with cryogenic coolant sources distributed along the power transmission cable and coupled to the copper layers and HTS wire. The result is a compact apparatus for cooling HTS devices. However, this apparatus also lacks a maximum heat transfer/high efficiency coefficient.

Accordingly, what is needed is an effective apparatus and method for reducing or maintaining temperatures of HTS devices using gaseous cryogens. Additionally, there exists a need for a compact, vacuum tight apparatus for cooling HTS devices with maximum heat transfer/high efficiency coefficient. This can be achieved through implementation of a heat sink to intercept the heat leak from the room temperature components to the superconducting cable. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for a cryogenic heat sink cooled by gaseous coolant to maintain the superconducting cable within operating range is now met by a new, useful, and nonobvious invention.

In an embodiment, the current invention is a method of maintaining an operating cryogenic temperature range of a low temperature system (e.g., including a superconductor). A heat intercept is attached to the lower temperature system that is temperature critical. This part may be, for example, the termination or intersection point between a copper conductor and high temperature superconducting cable. The heat intercept is pre-shaped to conform to the shape of the temperature-critical part. The heat sink, or at least the portion attached to the low temperature system, is formed of a heat conductive material. The heat intercept includes a heat sink, an inlet channel, and an outlet channel. The inlet and outlet channels extend from the heat sink, as the heat sink abuts the temperature-critical part of the system. The heat sink includes a plurality of fins affixed within its interior. The heat sink, inlet channel, and outlet channel are configured such that the inlet channel is in open communication with the interior of the heat sink and the outlet channel also is in open communication with the interior of the heat sink. A cryogenic gaseous medium is injected into the inlet channel, such that the gaseous medium enters the heat sink through the inlet channel and exits the heat sink through the outlet channel. Thus, since heat is transferred to and absorbed by the gaseous medium within the heat sink, the gaseous medium has a higher temperature when exiting the heat sink than when entering the heat sink.

This low temperature system may be a superconducting system, thus rendering critical the maintenance of the designed operating cryogenic temperature range. In an embodiment, the superconducting system may be a high temperature superconducting system because it is cooled to about seventy (70) Kelvin, but still can be deemed "high temperature", as it is relatively close to 77 Kelvin. However, the current invention also contemplates low temperature superconducting systems (about 4.2 Kelvin or below) and other systems that may have operational temperatures above 77 Kelvin, below 4.2 Kelvin, or between 77 Kelvin and 4.2 Kelvin. This system itself is deemed "low temperature" because the superconductor is the coldest part of the system, other than possibly the gas inlet port.

Upon exiting the outlet channel, the gaseous medium may be recirculated by a gas recirculation system that cools the gaseous medium for reentry into the inlet channel and heat sink for absorption of more heat.

The inlet and outlet channels may be positioned in angled relation to the heat sink.

Alternatively, the inlet and outlet channels may be positioned in parallel relation to the heat sink. In this case, the inlet channel would be coupled to one end of the heat sink, and the outlet channel coupled to the opposite end of the heat sink.

The portion of the heat intercept that attaches to the low temperature system may be planar or flat.

The plurality of fins may extend into the interior of the heat sink from the portion of the heat intercept that attaches to the low temperature system.

A vacuum chamber may be positioned around the temperature-critical part of the low temperature system and around the portion of the heat intercept that attaches to the low temperature system. The vacuum chamber reduces heat transfer from the ambient.

In a separate embodiment, the current invention is a method of maintaining an operating cryogenic temperature range of a high temperature superconducting system. A heat intercept is attached via a planar or flat surface to the part of the higher temperature system that is temperature critical. This part may be, for example, the termination or intersection point between a copper conductor and high temperature superconducting cable. The heat intersect is pre-shaped to conform to the shape of the temperature-critical part. The heat sink, or at least the portion attached to the low temperature system, is formed of a heat conductive material. The heat intercept includes a heat sink, an inlet channel, and an outlet channel. The inlet and outlet channels extend from the heat sink, as the heat sink abuts the temperature-critical part of the system. The heat sink includes a plurality of fins affixed to the planar surface within its interior. The heat sink, inlet channel, and outlet channel are configured such that the inlet channel is in open communication with the interior of the heat sink and the outlet channel also is in open communication with the interior of the heat sink. The inlet and outlet channels are positioned in parallel relation to the heat sink. The inlet channel would be coupled to one end of the heat sink, and the outlet channel coupled to the opposite end of the heat sink. A cryogenic gaseous medium is injected into the inlet channel, such that the gaseous medium enters the heat sink through the inlet channel and exits the heat sink through the outlet channel. Thus, since heat is transferred to and absorbed by the gaseous medium within the heat sink, the gaseous medium has a higher temperature when exiting the heat sink than when entering the heat sink. Upon exiting the outlet channel, the gaseous medium is recirculated by a gas recirculation system that cools the gaseous medium for reentry into the inlet channel and heat sink for absorption of more heat.

In a separate embodiment, the current invention is a heat intercept. The heat intercept includes a heat sink, a plurality of fins within the heat sink, an inlet channel, and an outlet channel. The heat sink has a base surface that attaches to a temperature-critical aspect of a low temperature system. The base surface has a shape conforming to the shape of the temperature-critical aspect. The base surface is formed of a heat conductive material. The inlet and outlet channels are each coupled to the heat sink and extend away from the heat sink. Both channels are configured for the flow of a cryogenic gaseous medium. The inlet channel is in open communication with the interior of the heat sink, and the outlet channel also is in open communication with the interior of the heat sink. A cryogenic gaseous medium enters the heat sink through the inlet channel and exits the heat sink through the outlet channel. Thus, since heat is transferred to and absorbed by the gaseous medium within the heat sink, the gaseous medium has a higher temperature when exiting the heat sink than when entering the heat sink.

This low temperature system may be a superconducting system, thus rendering critical the maintenance of the designed operating cryogenic temperature range.

A gas recirculation system may be coupled to the inlet and outlet channels for receiving the cryogenic gaseous medium that exited the heat sink through the outlet channel. The gas recirculation system recycles and cools the gaseous medium for reentry into the inlet channel and heat sink for absorption of more heat.

The inlet and outlet channels may be positioned in angled relation to the heat sink.

Alternatively, the inlet and outlet channels may be positioned in parallel relation to the heat sink. In this case, the inlet channel would be coupled to one end of the heat sink, and the outlet channel coupled to the opposite end of the heat sink.

The base surface of the heat intercept that attaches to the low temperature system may be planar or flat.

The plurality of fins may extend into the interior of the heat sink from the base surface of the heat intercept that attaches to the low temperature system.

A vacuum chamber may be positioned around the temperature-critical part of the low temperature system and around the portion of the heat intercept that attaches to the low temperature system. The vacuum chamber reduces heat transfer from the ambient.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 3A is an illustration of a heat sink part prior to brazing the parts together.

FIG. 4 further depicts surface temperature (in Kelvin) of the heat sink, along with the velocity field of the fluid flow

DETAILED DESCRIPTION OF THE PREFERRED EMBODIMENT

Figure 1:
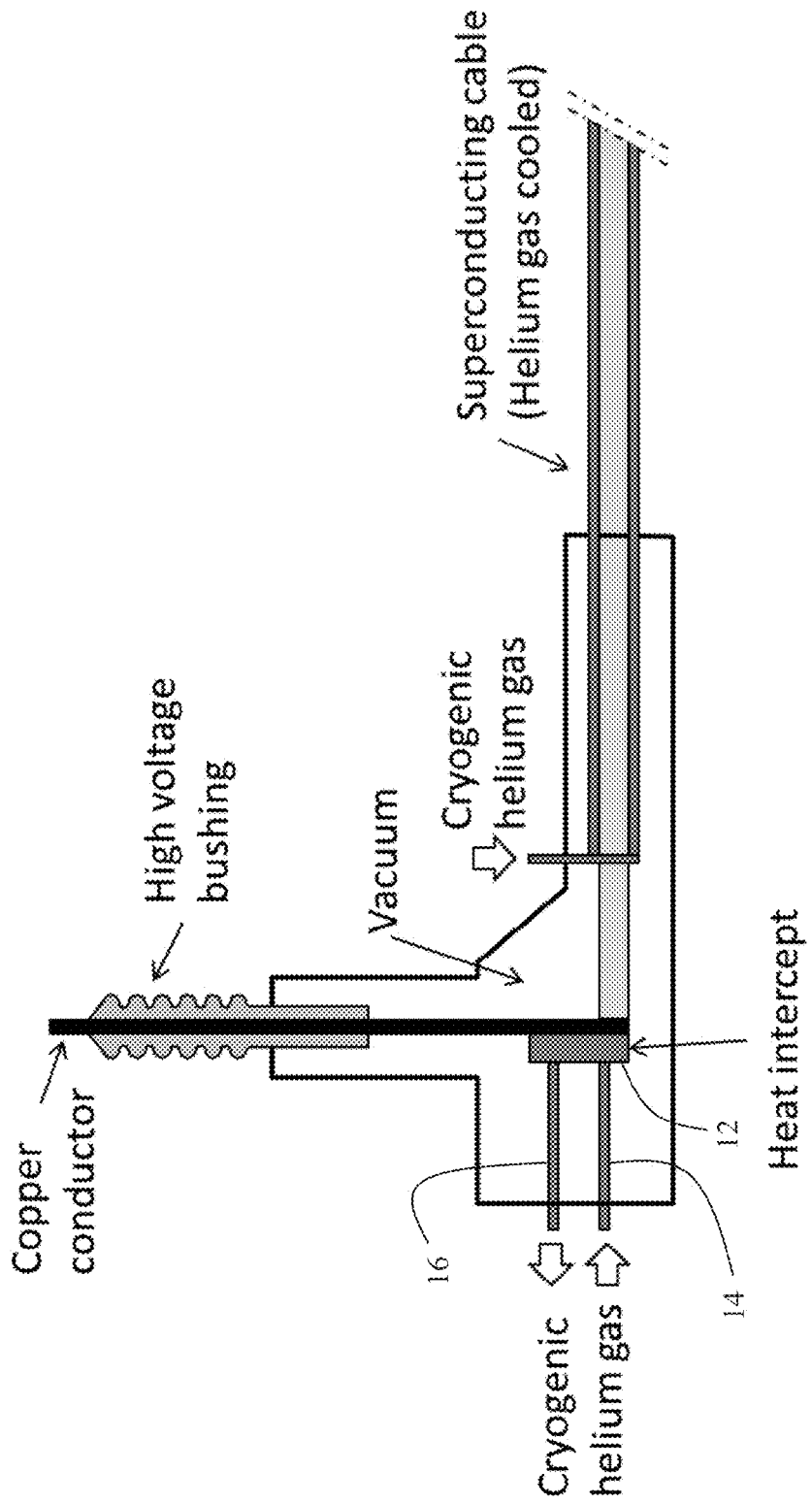
FIG. 1 is a schematic diagram of the cable termination with heat sink, HTS cable, and copper conductor for an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

In an embodiment, the current invention is a system and method of using a unique heat sink to maintaining temperatures in applications where the high voltage bushing/current cannot rise above a particular temperature. Such an application can be, for example, a superconducting device. The heat sink intercepts heat leaks from the ambient temperature components to the superconducting cable. Many numerical optimization studies for heat sinks of various types have been carried out in order to obtain high system performance or least flow resistance [5]-[7]. However, passive heat sinks use natural convection for heat dissipation, and active heat sinks typically use fans for forced convection for cooling typical heat-generating devices, such as computers. Current heat sinks are unable to utilize cryogenic gas for heat dissipation.

The high temperature superconducting (HTS) cable is inserted through a first end of the cable termination and connects to a copper conductor and high voltage bushing. The copper conductor and high voltage bushing lay perpendicular or in-line and in contact with the HTS cable. The copper conductor and high voltage bushing exit vertically through a top end of the heat sink. Helium gas is pumped through and exits through two tubes positioned on a second end of the heat sink opposite the first end. A vacuum chamber surrounds the relevant portions of the heat intercept to reduce heat transfer from the ambient. Typically, the HTS cable includes a helium inlet and a helium outlet for the flow of cryogenic helium gas, providing for a helium gas cooled HTS cable.

In an embodiment, the current invention is a method of cooling heat-generating devices having high voltage bushing where maintaining a consistent range of temperature is critical to the functionality of the device (i.e., flow of current). In an embodiment, this type of device has superconducting capabilities. To accomplish this method, a heat sink with inlet and outlet channels is utilized for gaseous flow, where the gaseous medium is capable of retaining heat transferred by the underlying device.

The heat sink includes a metal of high thermal conductivity (e.g., copper). The heat sink includes a flat surface that is coupled or attached to the heat-generating location that needs to be cooled, i.e., the location where the superconductor and the copper conductor intersect with one another at the cable termination. Two (2) hollow tubes or channels are affixed to the heat sink. One of the channels is the inlet for the cryogenic gaseous coolant, and the other channel is the outlet for the cryogenic gaseous coolant. The coolant enters through the inlet channel, passes through the finned area inside the heat sink, and exits through the outlet channel.

A simple heat sink at ambient would be insufficient to maintain the operative temperatures needed for typical superconductors, and thus a heat sink is utilized as well for forced cooling.

The interior of the hollow heat sink includes fins to increase metal surface in contact with the gaseous coolant. The surface area must be high to ensure optimal heat transfer from the metallic surface to the gaseous coolant. The fins are spaced in a manner to optimize heat transfer. At the same time, the pressure drop of the gaseous coolant must be minimized for efficacy of the heat sink.

In an embodiment, the geometry of the fins of the heat sink includes two sets of non-uniformly spaced straight fins, thus achieving sufficient heat transfer while keeping the pressure drop low. The geometry can be optimized accordingly to allow machining by conventional mechanical methods and/or electric discharge machining.

Example 1

FIG. 1 depicts an exemplary embodiment of the current invention. In this figure, an HTS cable intersects with a copper conduct with high voltage bushing within a vacuum chamber as can be seen in a typical superconducting power device. At the intersection or junction point of the copper conductor and HTS cable is a termination. Heat sink 12 has an aspect (e.g., a planar side) that abuts the termination or the copper conductor.

Inlet channel 14 is hollow and is angled (e.g., perpendicular) in relation to heat sink 12. Inlet channel 14 is structured for the flow of a gaseous coolant, such as helium, hydrogen, neon, or other cryogenic gases or mixtures thereof. Inlet channel 14 is coupled to heat sink 12 such that inlet channel 14 and heat sink 12 are in open communication with one another. On the opposite end of inlet channel 14, inlet channel 14 is coupled to a conventional gas recirculation system (not seen), such as that seen in [19].

Outlet channel 16 is hollow and is angled (e.g., perpendicular) in relation to heat sink 12. Outlet channel 16 is structured for the flow of gaseous coolant, such as helium, hydrogen, neon, or other cryogenic gases or mixtures thereof. Outlet channel 16 is coupled to heat sink 12 such that outlet channel 16 and heat sink 12 are in open communication with one another. On the opposite end of outlet channel 16, outlet channel 16 is coupled to the conventional gas recirculation system to which inlet channel 14 is coupled.

Inlet channel 14 and outlet channel 16 are in communication with each other through heat sink 12.

In operation, a predetermined gaseous medium or coolant with cryogenic properties flow through angled inlet channel 14 into heat sink 12. The input temperature and pressure at the heat sink can be adjusted depending on the cooling requirements. Heat is distributed from heat sink 12 into the gaseous medium, and the heated gas, in turn, flows through heat sink 12 and into angled outlet channel 16. Subsequently, the heated gas exits outlet channel 16 of the heat intercept and enters the gas recirculation system. At this point, the gas recirculation system can cool the heated gaseous medium for reentry into the heat intercept via inlet channel 14. In an embodiment, the gaseous medium enters inlet channel 14 at a temperature of about 50 Kelvin. In this embodiment, the gaseous medium may exit outlet channel 16 at a temperature of about 60 Kelvin. Thus, the change in temperature is about 10 Kelvin. The gaseous medium is recycled in the recirculation system that cools the gas down.

Example 2

In a specific embodiment, the current invention is a heat sink formed of copper and featuring eighteen (18) fins. The heat sink was tested for effectiveness. All numerical computer simulations were run using COMSOL Multiphysics Heat Transfer Module. The simulations were run on a computer with eight CPU cores (2× Intel Xeon X5570) with 24 GB RAM and 2.93 GHz processor speed. Due to the assumed symmetry of the heat intercept (i.e., geometric and thermal symmetry), only half of the heat sink was simulated to reduce overall computational time to arrive at steady state results. A two-dimensional (2-D) steady state model was designed to determine the ideal number of fins required to be made in the heat sink to have the best balance between enhanced heat transfer and reduced pressure losses. Further, a three-dimensional (3-D) model was computed to provide a full coupled analysis of the fluid flow and heat transfer mechanism using the design parameters obtained in 2-D analysis. The 3-D model provides a more accurate representation of the actual flow field.

FIGS. 2A-2D and 3A-3C are illustrations of a heat intercept according to an embodiment of the present invention. The heat intercept is generally denoted by the reference numeral 20. Heat intercept 20 is formed of heat sink 22, 24, inlet channel 26, and outlet channel 28. The heat sink is formed of copper and includes eighteen (18) fins often (10) cm length each, though size and length of the heat sink and number of fins would depend on the application being cooled.

The heat sink is integrated in cylindrical copper tube 24 with planar bottom surface 22 beneath fins 30 with rounded top surface formed by copper tube 24. Planar bottom surface 22 allows for known and variable thermal load to the heat sink. The heat sink is disposed within copper tube 24 and is structured so that the pressure drop due to phase change is minimized, while the system pressure is high. Cryogenic helium gas is injected at high pressure by a conventional external helium circulation system, such as that seen in [18]. The input temperature and pressure at the heat sink are fixed at 50 K and 1.82 MPa, respectively, with flow rate up to 20 g/s. The heat sink and associated connections are enclosed in a vacuum chamber to reduce the heat transfer from the ambient.

Still referring to FIGS. 2A-2D and 3A-3C, the heat sink includes four parts: base block 22 with fins 30, two end plates forming inlet channel 26 and outlet channel 28, and tube 24 surrounding the other parts. All parts except for the cuts between fins 30 were machined mechanically. The cuts were machined by electrical discharge machining (EDM). It is noted that different manufacturing methods may be employed. The four parts were joined by silver braze for maximum thermal conductivity, maximum gas tightness, and excellent structural strength. The supply tubes were soldered into inlet channel 26 and outlet channel 28 in the end plates using tin-lead solder.

For testing the efficiency of the heat sink, heater wire (not seen) was attached to planar base plate 22 by epoxy resin. Heater 32 was based on resistance wire. The type of resin (Stycast 2850FT) was chosen for its high thermal conductivity, achieved by a high content of aluminum oxide filler. A temperature sensor (not seen) was also embedded for recording and for experimental purposes to determine the efficiency of the heat sink design.

The heat sink was then wrapped in layers of aluminized Mylar (multi-layer insulation, MLI) and installed in the vacuum chamber to reduce the heat transfer from the ambient. Aluminized Mylar can provide more accurate characterizations of the heat sink in order to test the efficiency of the heat sink. Thus, the current invention contemplates use without aluminized Mylar because of its limited high voltage withstand capability.

Two additional temperature sensors (not seen) were attached to tube 24 to measure the inflow and outflow temperatures. A conventional adjustable DC voltage source (not seen) was used to control the heat influx to heat intercept 20. The helium circulation system allows control of pressure and temperature of the helium inflow. A differential pressure gauge (not seen) was used to measure the pressure drop in heat intercept 20 for informational and experimental purposes.

Although helium was utilized in this example, hydrogen, neon, or other suitable cryogenic gaseous medium may be utilized.

Two-Dimensional Heat Transfer

Figure 2A:
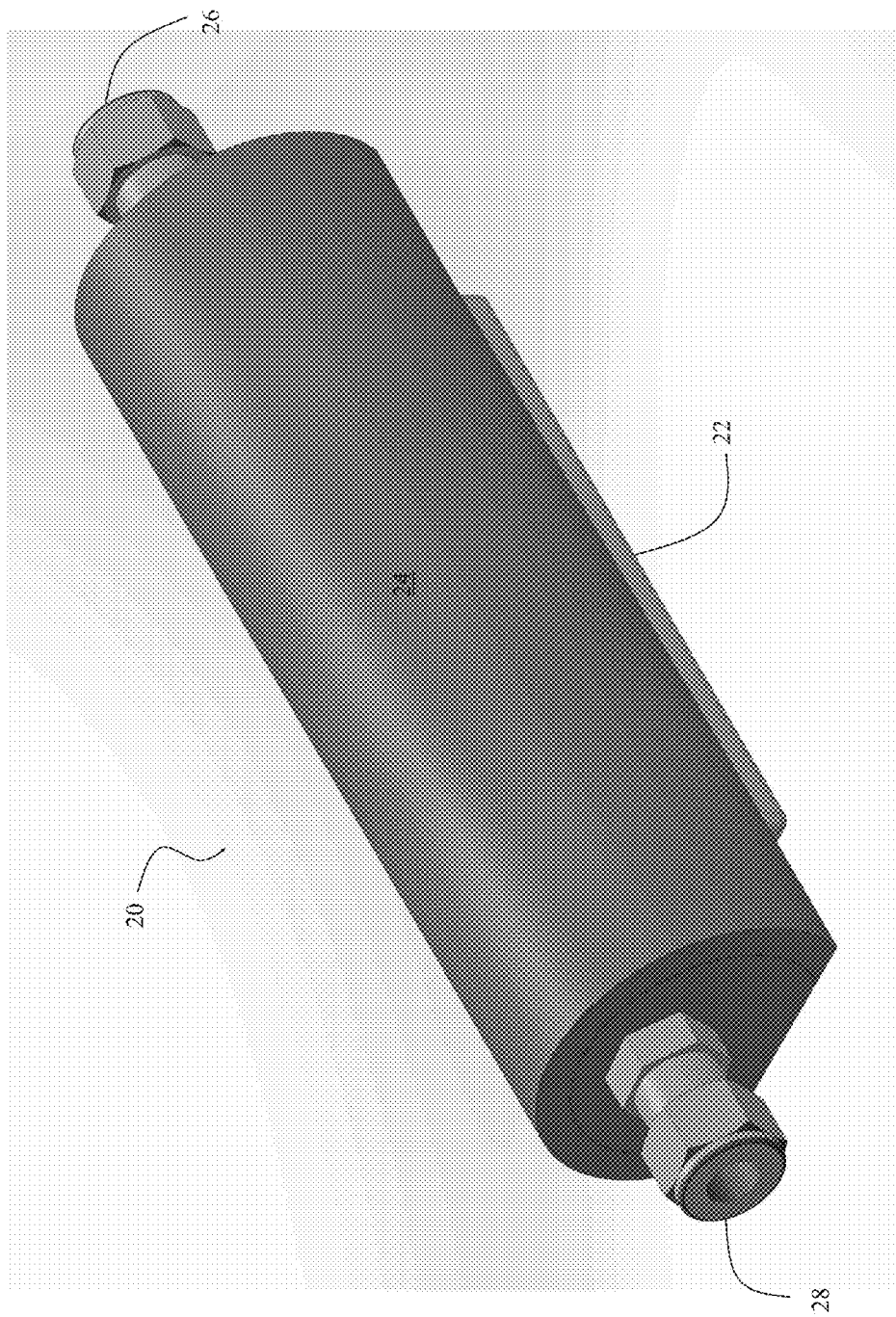
FIG. 2A depicts a heat sink with inlet and outlet channels according to an embodiment of the current invention.
Figure 2B:
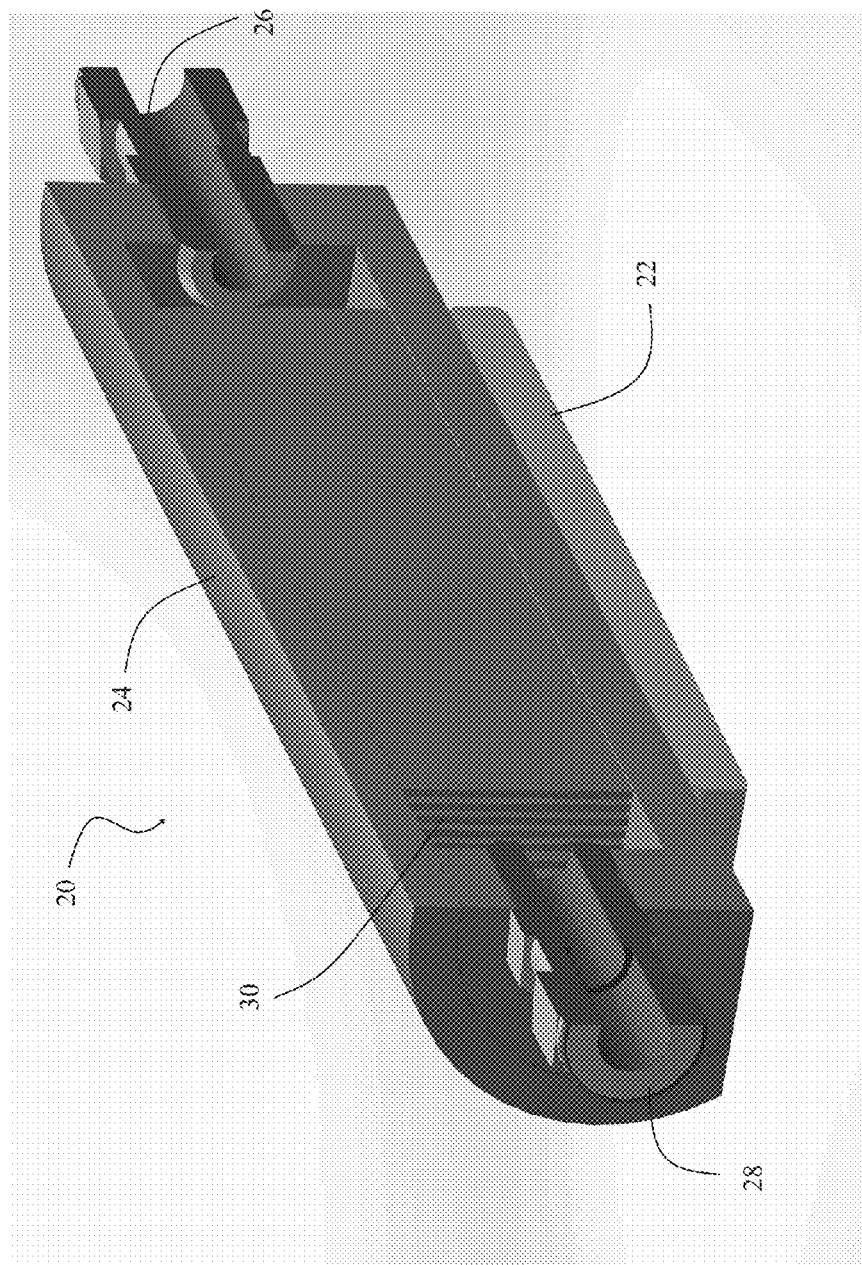
FIG. 2B is a vertical cross-sectional view of the heat sink of FIG. 2A, showing the fins of the heat sink.
Figure 2C:
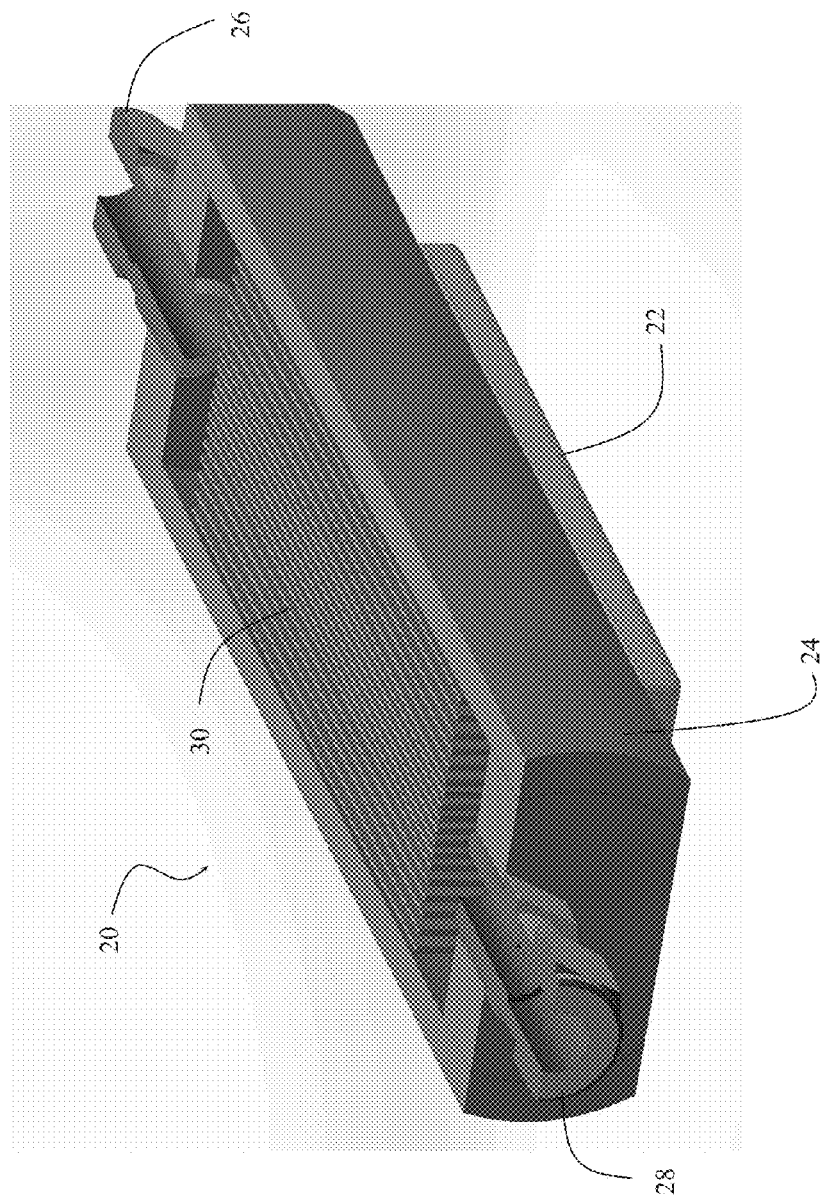
FIG. 2C is a horizontal cross-sectional view of the heat sink of FIG. 2A, showing the fins of the heat sink.
Figure 2D:
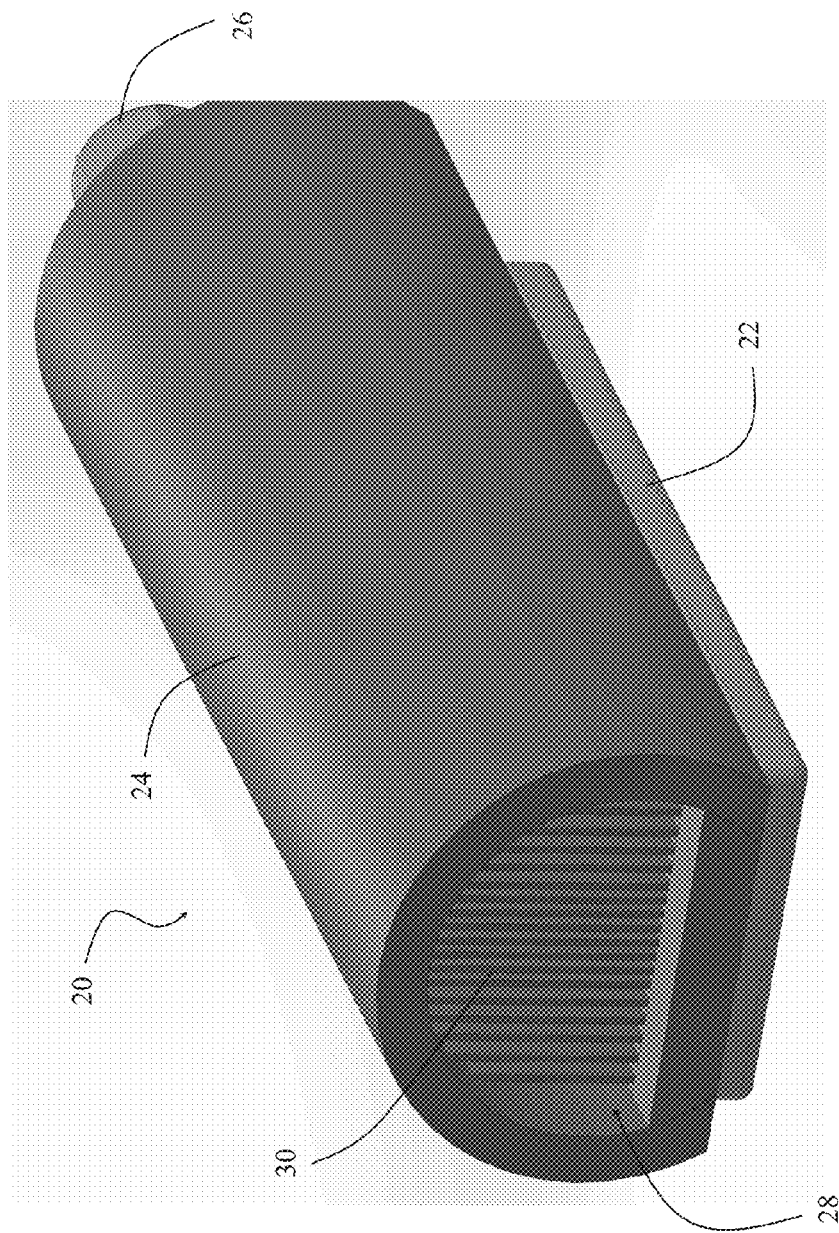
FIG. 2D is perspective view of the heat sink of FIG. 2A without the inlet channel.
Figure 3B:
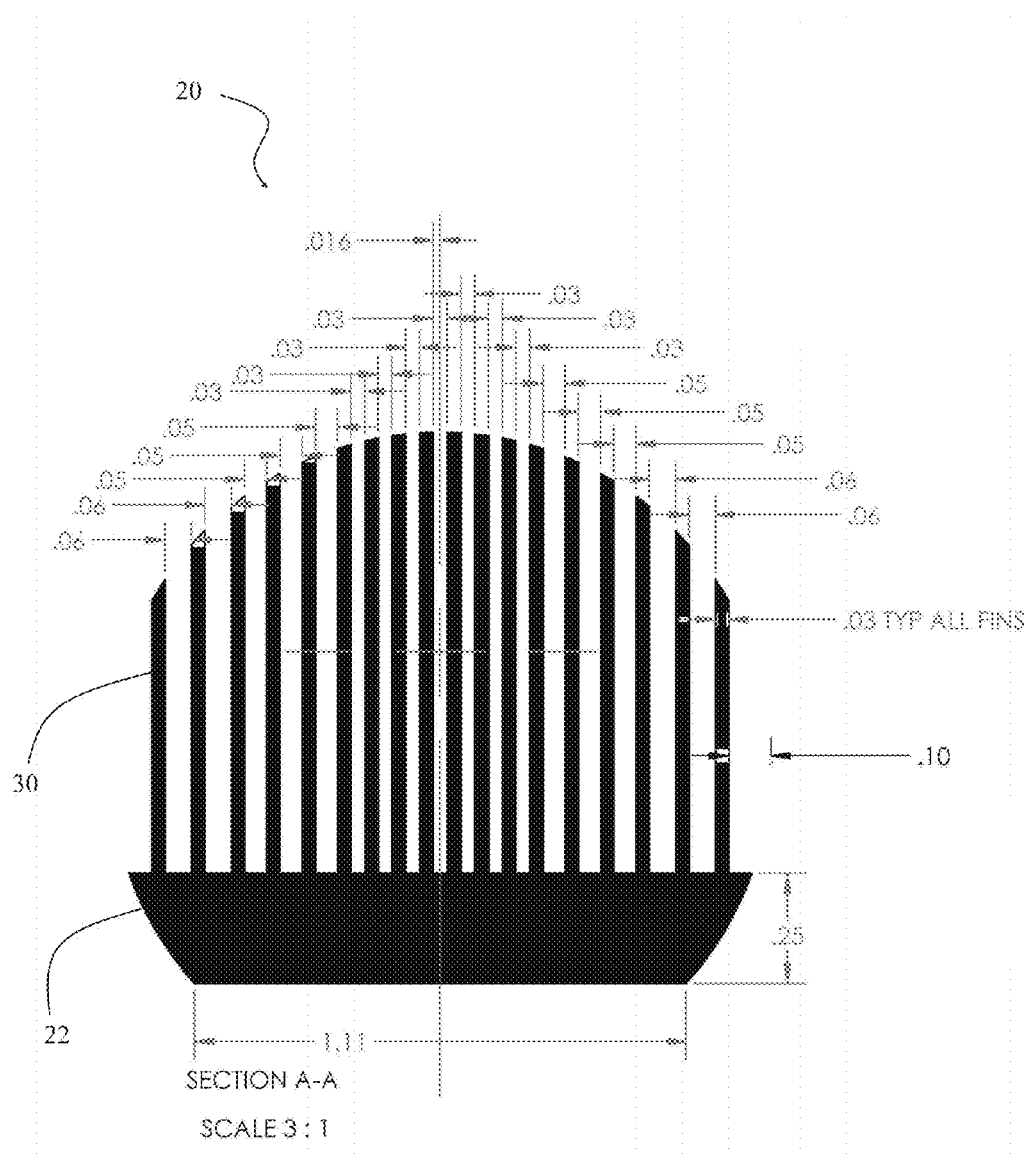
FIG. 3B is an end view of the heat sink part of FIG. 3A.
Figure 3C:
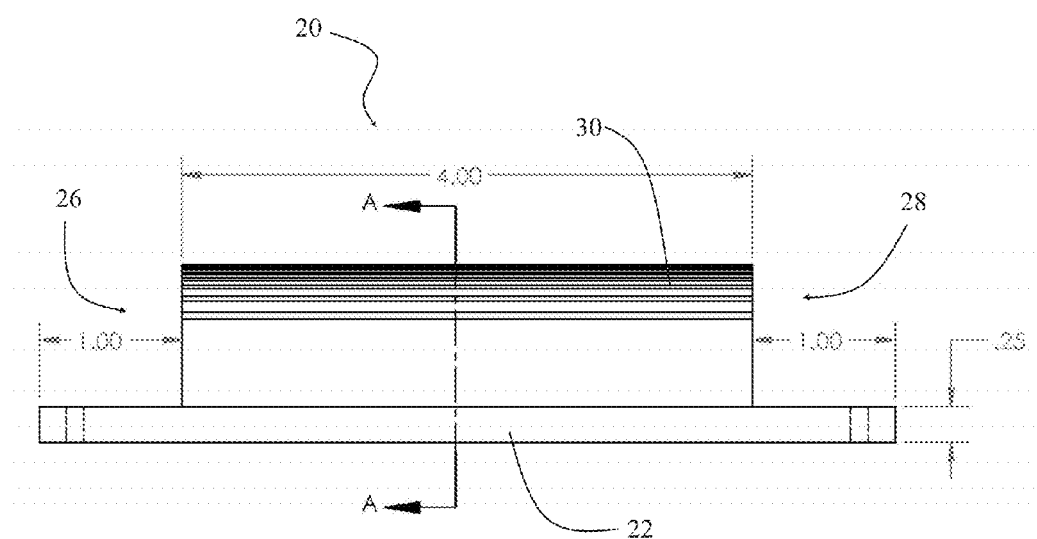
FIG. 3C is a side view of the heat sink part of FIG. 3A.

Due to the vertical and horizontal cross sections taken as seen in FIGS. 2B and 2C, the focus of two-dimensional numerical simulation is on heat transfer mechanism (i.e., excludes fluid flow), whereas the pressure loss is calculated analytically taking into account the flow between the parallel plates only and neglecting entrance effects and density variations. The 2-D helps determine the ideal number of fins 30 for a given overall width of base plate 22 of the heat sink.

The COMSOL Multiphysics Heat Transfer in Solids module was used over a parameterized geometry so as to allow optimization by sweeping over geometrical spacing of fins 30. COMSOL Multiphysics calculates the properties of copper, namely thermal conductivity, k; specific heat at constant pressure, cP; and density, ρ, all of which are temperature dependent as given by [9]. With an initial temperature of 50 K, a heat influx boundary condition of 50 W was applied at the base of the 2-D model appearing as a line at the bottom in the front view. The helium properties were calculated using Engineering Equation Solver (EES) software package at the required temperature and pressure. EES provides many built-in thermophysical and transport property functions useful for engineering calculations. EES uses an implementation of [10], [11] for calculating thermophysical properties except for thermal conductivity which is computed using [12]. Reynolds number (ReDh) is calculated using the hydraulic diameter concept for parallel plate fins consistent with the geometry and mass flow rate assumed. Correlations for both laminar and turbulent flow (if any) between parallel plates, as given in [13], were used to find the heat transfer co-efficient (h) and pressure losses inside the heat sink.

$$N_u = \frac{hD_h}{k} = 8.235 \text{ (Laminar)} \quad (1)$$

$$N_u = 0.023 \, \text{Re}_{D_h}^{\frac{4}{5}} Pr^{0.4} \text{ (Turbulent)} \quad (2)$$

For a smooth surface, friction factor for laminar and turbulent regime respectively is given by $$f = \frac{96}{\text{Re}_{D_h}} \quad (3)$$

$$f = 0.316(\text{Re}_{D_h})^{-1/4} \quad (4)$$

The pressure loss is heat sink is estimated as $$\Delta p = f \frac{\rho U_m^2 l}{2 D_h} \quad (5)$$

where Dh=2*(fin spacing), $U_m$ is the mean velocity of gHe, l is the length of the heat sink, $N_u$ is the Nusselt number.

The initial temperature in the copper domain was considered to be 50 K with a total heat input of 50 W at the base of the 2-D model. The helium flow was found to be in laminar region with convective cooling boundary on the fin walls. In the case of the model with nine (9) fins, which actually has eighteen (18) fins but is halved since the heat sink is symmetrical (i.e., this reduces computational burden), for example, using the above relations, an effective heat transfer coefficient value of h=90.25 W/(m²K) for the convective boundary condition was calculated and used for the 9-fin model. Separate values of h were calculated for different flow conditions and geometries based on the Dittus-Boelter correlation. The pressure drop was calculated separately using the Moody Diagram and laminar regime correlations. The governing equation for convective cooling is represented in COMSOL as follows:

$$-n \cdot (-k \nabla T) = h(T_{ext} - T) + q_0 \quad (6)$$

The heat load is applied at planar bottom surface 22, as a boundary condition to represent the actual heater surface with a total input of 50 W.

The mesh size was chosen as of medium density ("normal") with the default values as available in the general physics category. The medium density mesh with 2986 element is sufficient to satisfy mesh independence. Stationary Linear Solver produced the results as shown in FIG. 5.

Figure 5:
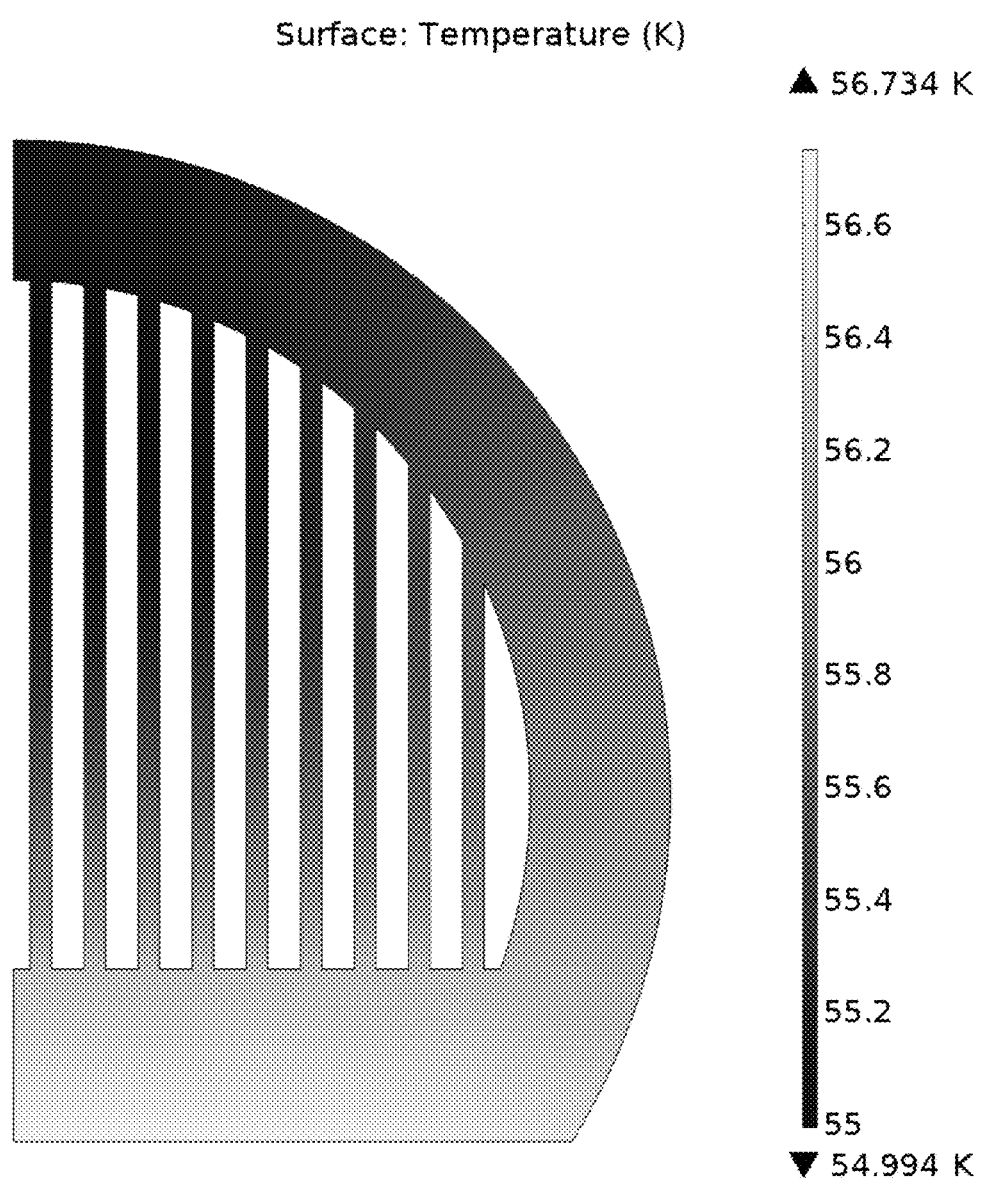
FIG. 5 depicts half-domain cross-section-surface temperature (in Kelvin).
Figure 6:
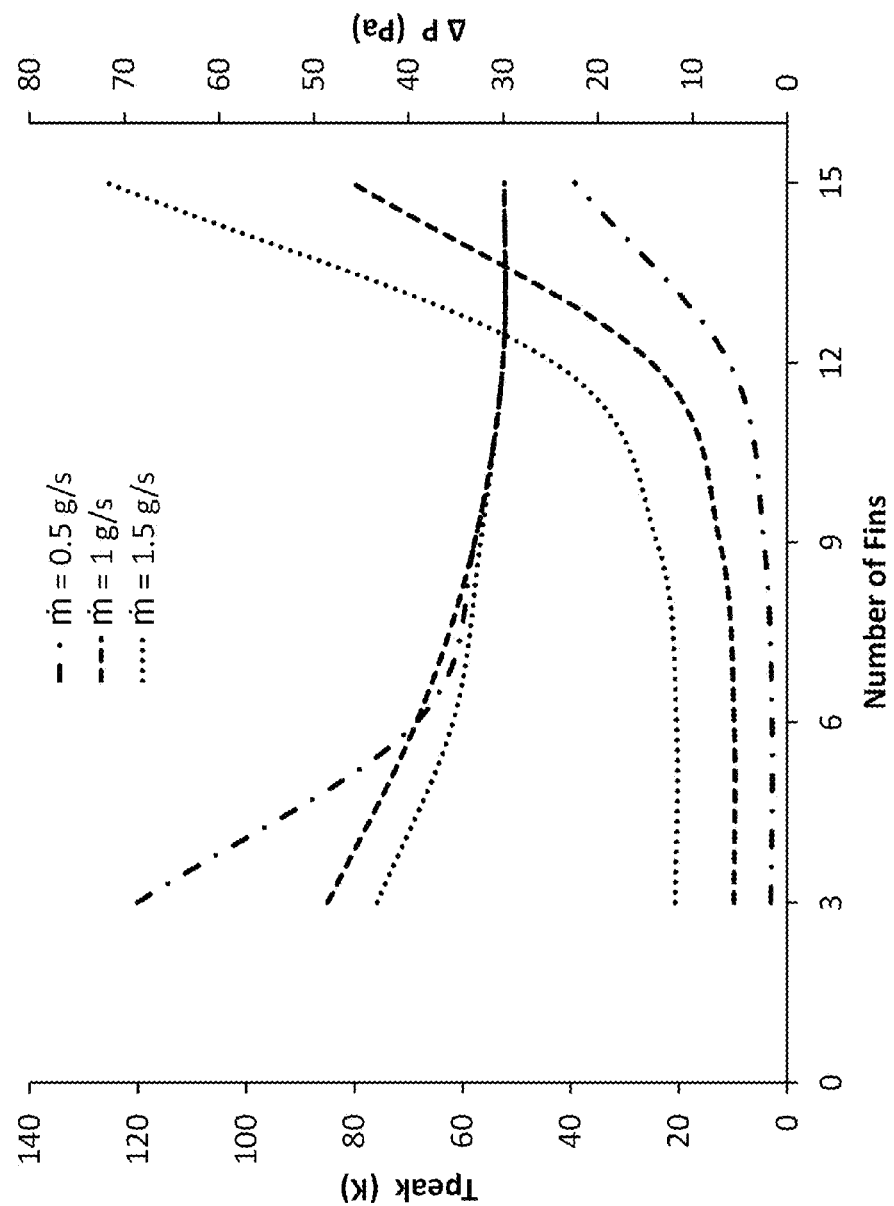
FIG. 6 is a graphical illustration of $T_{peak}$ (peak temperature variations) and $\Delta p$ (pressure drop behavior) curves for various mass flow rates across the inlet and outlet channels.

FIG. 5 indicates the surface temperature distribution across a vertical cross-section of the heat sink. FIG. 6 shows maximum heat sink temperature and pressure drop as a function of number of fins for three different mass flow rates. It can be seen from FIG. 6 that flow rates of below 1 g/s are sufficient at 50 W input power. It further can be seen that the heat sink with nine (9) fins, corresponding to half of the full design with eighteen (18) fins, provides an effective system balance between pressure drop and temperature gradient for the performance of the heat sink. This primary two-dimensional study forms the basis for further detailed three-dimensional analyses and experimental validation.

Three-Dimensional Heat Transfer

Cryogenic circulation systems have been typically limited by the pressure loss (or boost from the perspective of the circulation system) handling capabilities. The two-dimensional analysis provides a rough estimate of the pressure losses inside the heat sink but in order to predict the exact nature of helium gas flow and its effects on the thermal performance of the heat sink, a fully coupled three-dimensional model was developed using the Conjugate Heat Transfer (ntif) physics module in COMSOL Multiphysics 4.3. Steady state results, assuming laminar flow consistent with experimental mass flow rates, were obtained.

The geometry was divided into solid (copper) domain and fluid (helium gas) domain. The copper and helium properties were temperature and/or pressure dependent. The property functions were implemented in COMSOL using [9], [14]-[16]. For temperatures below 140 K, COMSOL does not provide any temperature dependence density function in the present module. For this, EES was used to calculate a piece-wise function for temperature dependent helium properties. Helium density was evaluated at average fluid operating temperature and provided as input to COMSOL.

The governing energy equation for the heat transfer in the copper domain is governed by a conduction equation as represented by COMSOL as follows:

$$\rho c_p u \cdot \nabla T = \nabla \cdot (k \nabla T) + Q \quad (7)$$

where k represents the thermal conductivity of copper, Q represents the heat source, $c_p$ represents the specific heat of copper at constant pressure, u represents the copper velocity (which is zero), $\rho$ represents copper density, and T represents the temperature of copper. These parameters are default as defined by COMSOL for copper material.

The governing momentum and energy equations for fluid flow domain are:

$$\rho(u \cdot \nabla)u = \nabla \cdot \left[ -pl + \mu(\nabla u + (\nabla u)^T) - \frac{2}{3}\mu(\nabla \cdot u)l \right] \quad (8)$$

$$\nabla \cdot (\rho u) = 0 \quad (9)$$

$$\rho c_p u \cdot \nabla T = \nabla \cdot (k \nabla T) \quad (10)$$

where $\rho$ represents the gaseous helium density, l represents the characteristic length, p represents the fluid pressure, k represents the fluid thermal conductivity and T represents the fluid temperature.

A parabolic velocity distribution at the entrance of inlet channel 26 was assumed, and a surface heat flux at the bottom is used to model the heat influx. The initial temperature and helium inlet temperature were 58.6 K, the helium inlet pressure was 857 kPa, the total heat flux was 50 W, the flow rate was 0.738 g/s, and the thickness of each fin 30 was 0.79 mm.

Figure 4:
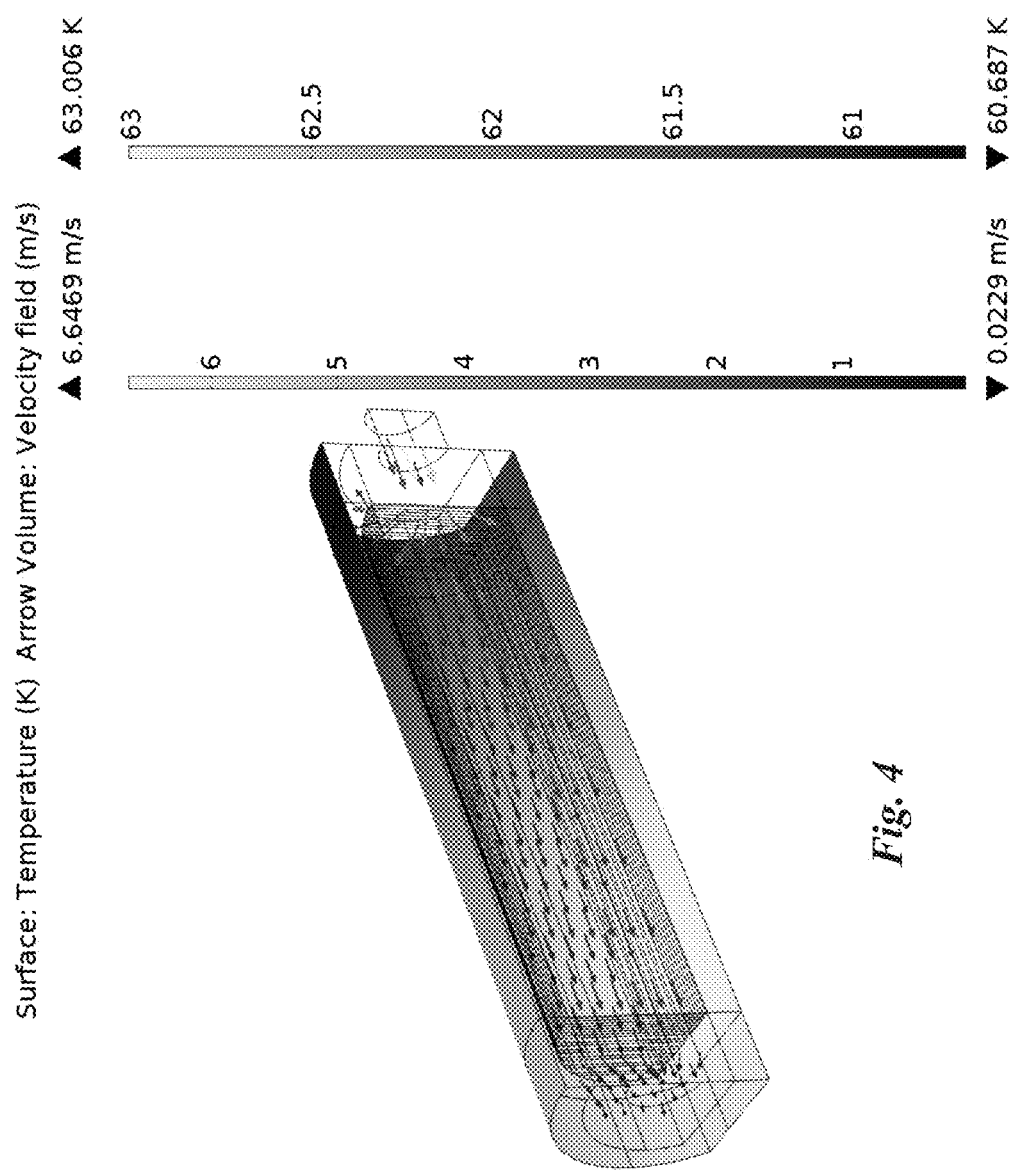
FIG. 4 is an illustration of surface temperature of the heat sink along with the velocity field of the coolant flow for an embodiment of the present invention.

A non-uniform mesh with higher mesh density towards the fluid/solid interfaces was used. Mesh independence tests resulted in a mesh size of 1.5 million elements. The temperature and velocity fields obtained from the computation are shown in FIGS. 4A and 4B.

Experimental Validation

Two different cases with 50 W and 100 W heat input were studied at certain helium pressure and mass flow rate conditions as shown in Table 1.

TABLE 1

Comparison of simulation results with measurements.

| Parameter | 50 W | | 100 W | |
| --- | --- | --- | --- | --- |
| | Model | Experiment | Model | Experiment |
| Temperature inlet [K] | 58.6 | 58.6 | 65.5 | 65.5 |
| Temperature increase [K] | 4.15 | 4.7 | 6.45 | 7.3 |
| Temperature heat sink [K] | 63.0 | 77.3 | 73.8 | 84.0 |
| Pressure drop [Pa] | 284 | 294 | 313 | 297 |

For the 50 W case, the input helium conditions are 857 kPa and 58.6 K whereas for 100 W heat input these values are 973 kPa and 65.5 K respectively. These values are used as inputs to simulate the results for temperature gradient and pressure drop across the heat sink. The resulting outlet temperature and pressure drop correspond reasonably well with experimental values. However, the calculated temperature increase of the maximum heat sink temperature is considerably lower than the measured value from the experiment. The reason for the mismatch is currently being investigated.

An experiment conducted in [8] was used to validate the results. Table 1 summarizes the comparison. An effective balance was observed for helium temperature gain and pressure drop.

Geometrical Optimization of Heat Sink

After validating the model, optimization studies were carried out for various geometrical parameters of the heat sink with nine (9) fins (half section) 30. Many optimization studies can be carried out since this heat sink incorporates a vast variety of variables such as geometrical parameters, gaseous helium mass flow rate, thermal mass of copper, fluid operating pressure, etc. Here, the focus was on the geometrical parameters, particularly on spacing between fins 30, while keeping all the other input parameters constant.

Figure 7A:
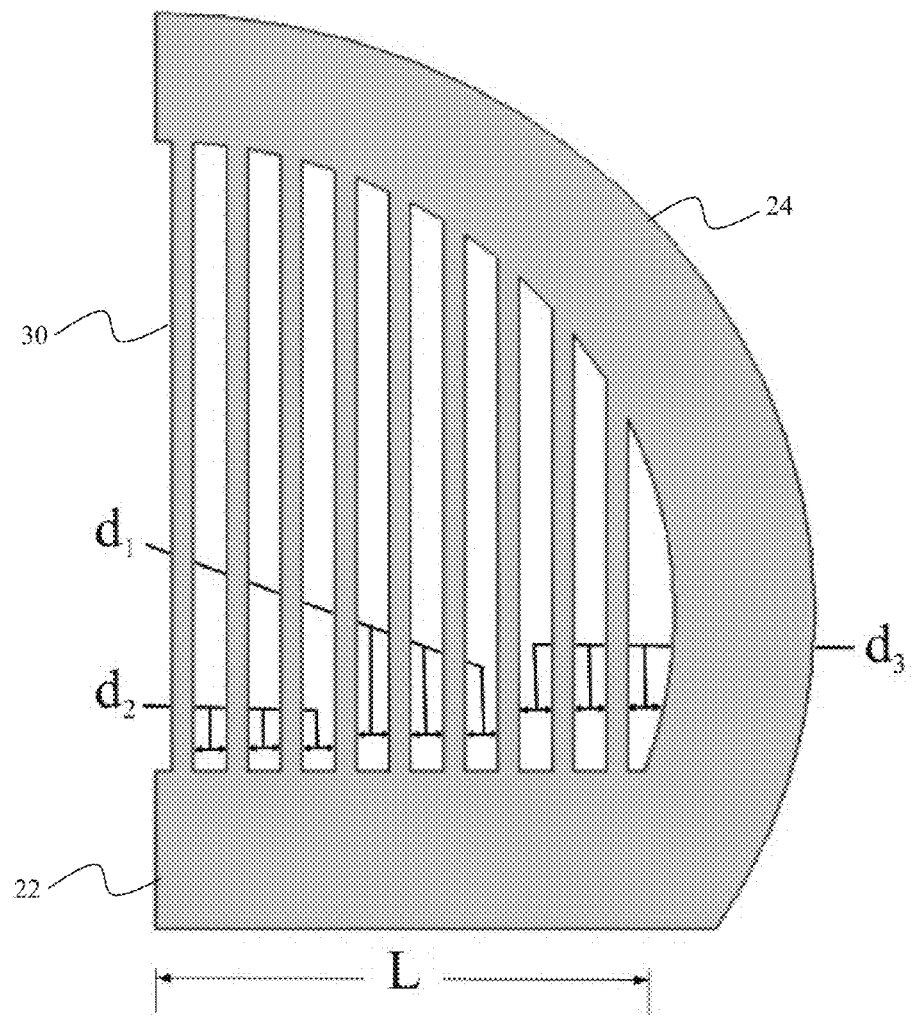
FIG. 7A depicts a vertical cut section of a heat sink showing optimized geometrical parameters.
Figure 7B:
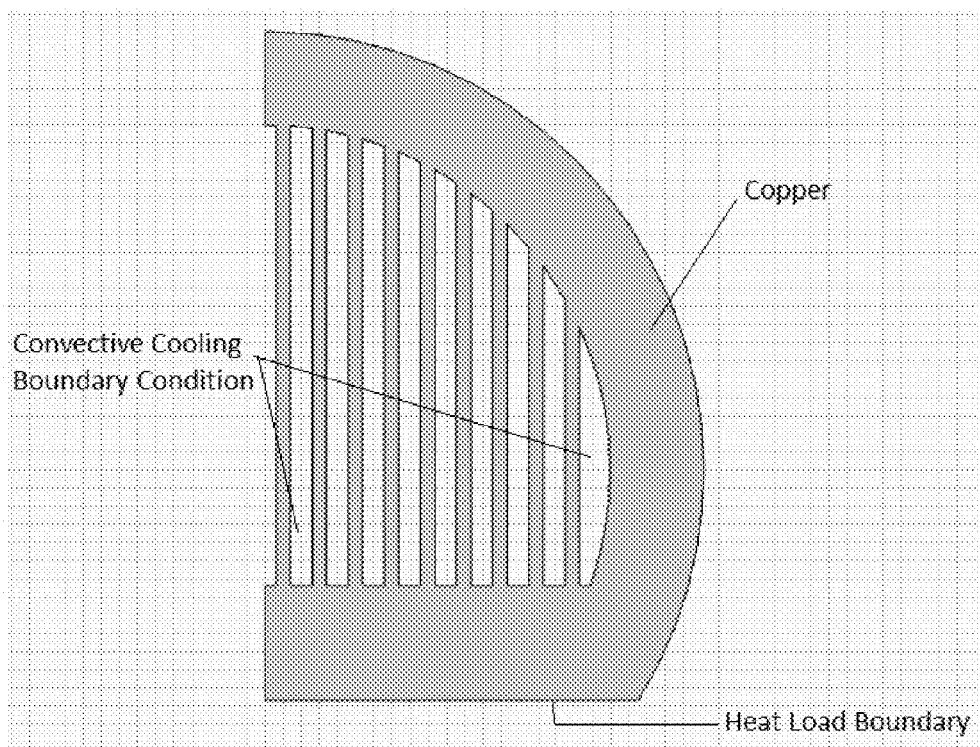
FIG. 7B depicts the two-dimensional model of the heat sink according to an embodiment of the current invention.
Figure 8A:
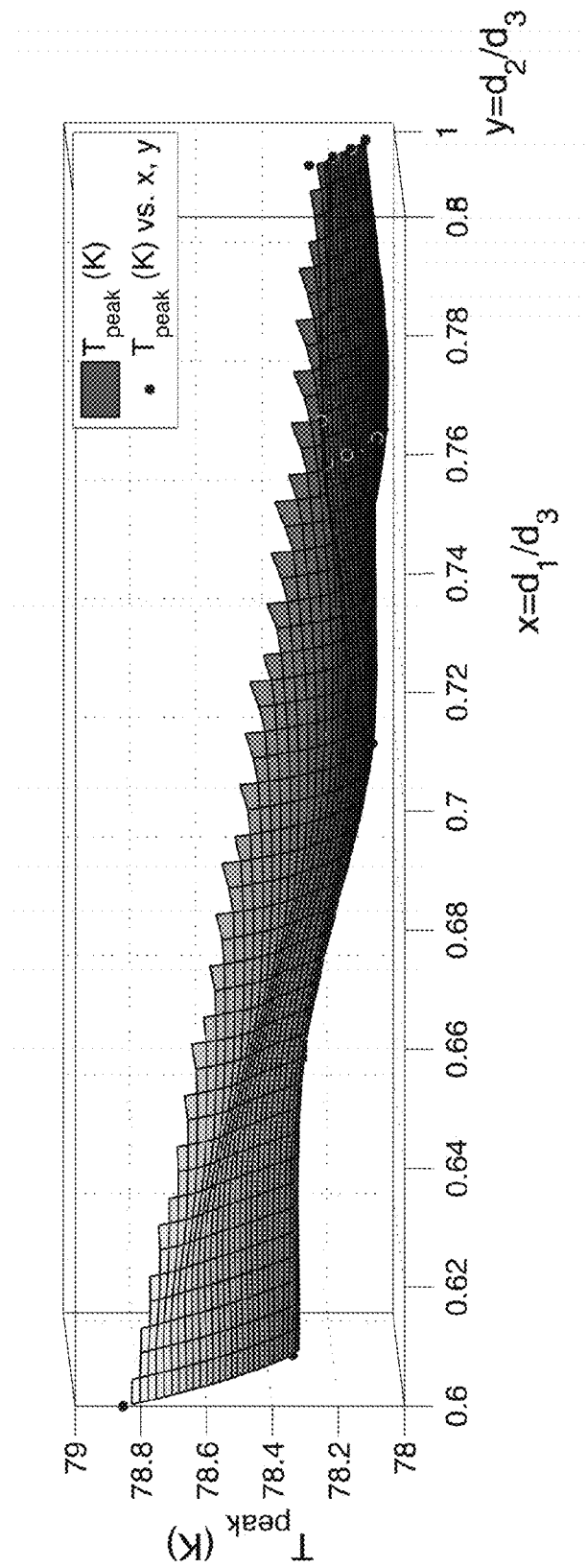
FIG. 8A is a contour plot depicting variation of heat sink peak temperature with fin spacing.
Figure 8B:
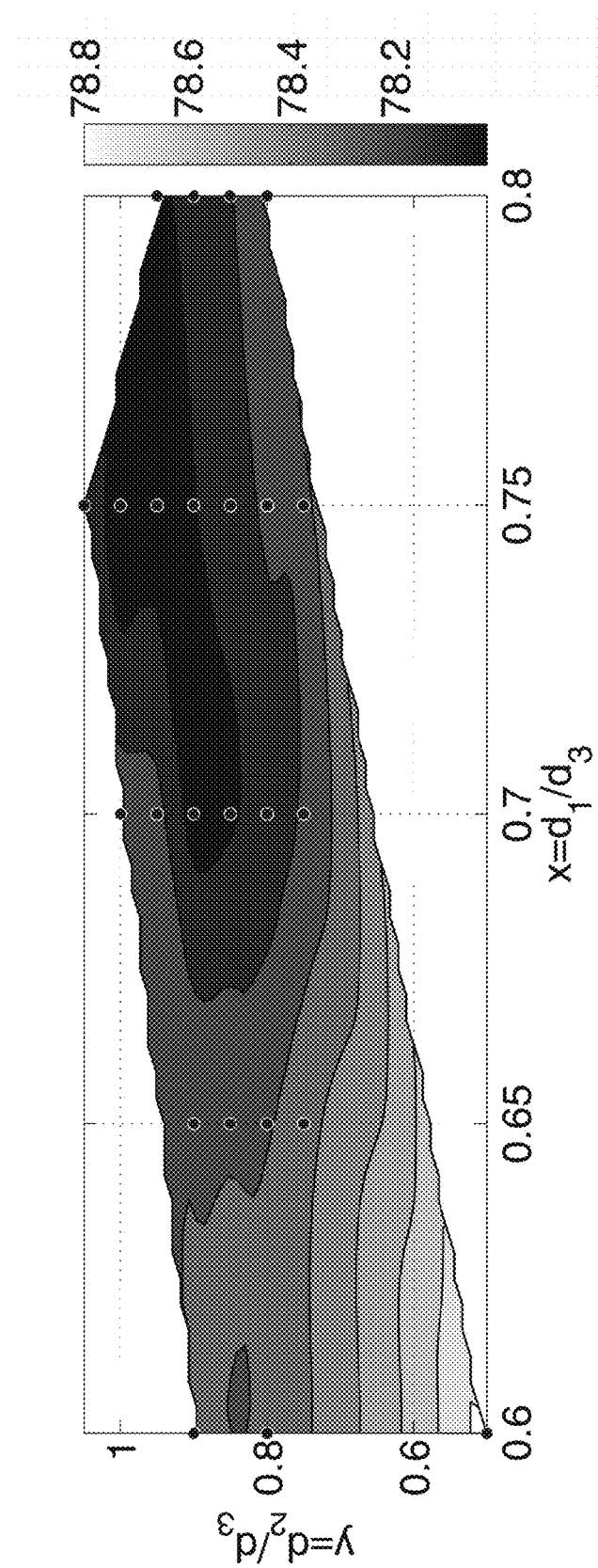
FIG. 8B is a contour plot depicting optimized geometry for minimum peak temperature.
Figure 9A:
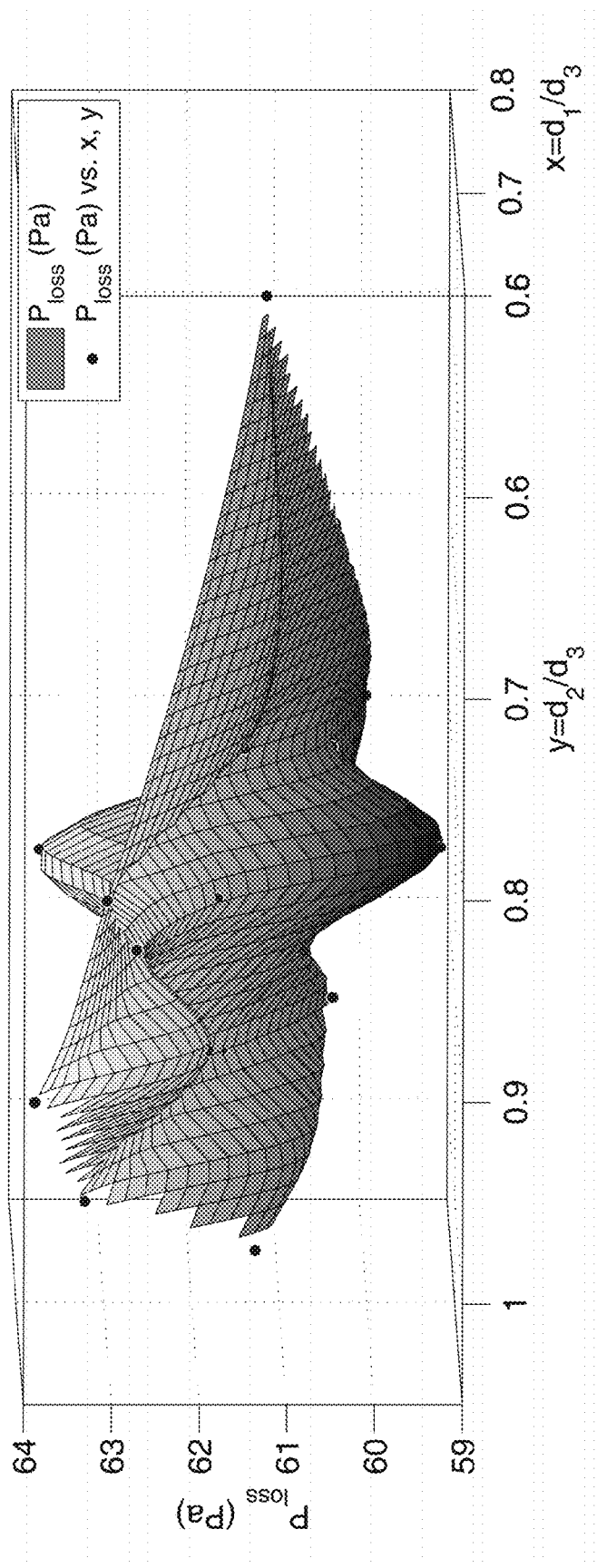
FIG. 9A is a contour plot depicting variation of pressure loss across a heat sink with fin spacing.
Figure 9B:
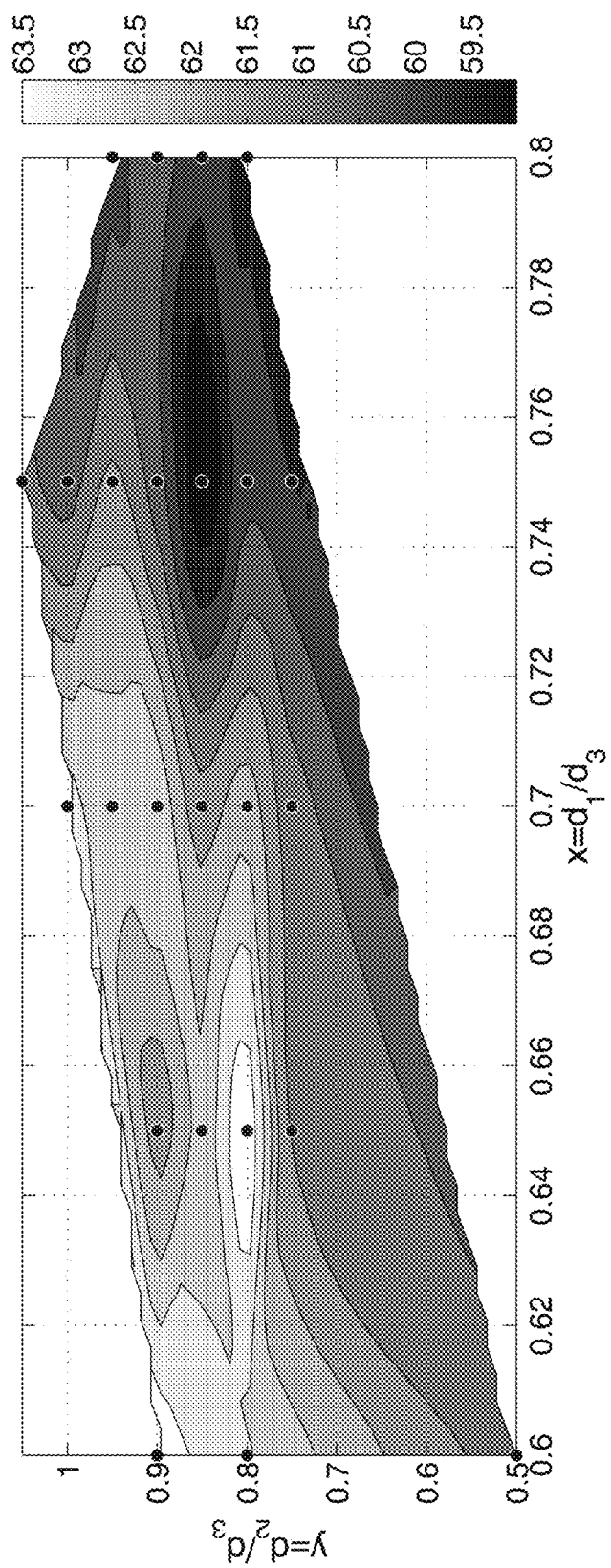
FIG. 9B is a contour plot depicting optimized geometry for minimum pressure loss across a heat sink.

The various important geometrical parameters are shown in FIG. 7A, and the 2-D model is shown in FIG. 7B. Equation (11) integrates the relationship between each of these geometrical parameters.

$$L = \frac{d_1}{2} + 3 \times d_1 + 3 \times d_2 + 3 \times d_3 + 9 \times t \quad (11)$$

where L is the total length available to place the fins; and $d_1$, $d_2$, and $d_3$ are different spacing between fins 30; and t is the fin thickness.

Non-dimensionalizing Equation (11) with respect to $d_3$ and keeping L as a constant known value provides the following equation:

$$\frac{L}{d_3} = \frac{x}{2} + 3x + 3y + 3 + 9 \times \frac{t}{d_3} \quad (12)$$

Maintaining the thickness constant, the value of $d_3$ can be determined for various values of $x = d_1/d_3$ and $y = d_2/d_3$, thereby satisfying the overall constraint on the heat sink geometry. Keeping all the other input parameters constant, optimization studies were performed by plugging in the values of $d_1$, $d_2$ and $d_3$ in each case into the validated 3-D COMSOL model. Studies utilized parameters where $x < y \le 1$. FIGS. 8A-8B and 9A-9B show the optimization curves for a given set of input conditions:

Heat Influx=100 W, gHe ṁ=0.54 g/s, L=17.8 mm, t=0.79 mm, Helium Density=6.3 kg/m³.

The results show that the performance of the heat sink can be increased by incorporating unequal spacing of fins 30 in the heat sink. This performance increase is expected to be considerable for operating conditions and system parameters that are higher than those considered in the present study and in operation of the test apparatus.

Three-Dimensional Fluid Flow

The purpose of the fluid flow model was to optimize the spacing between fins. In order to maximize heat transfer to the fluid, the flow should be evenly distributed between the fins. Of equal importance is the total pressure drop across the heat sink. Cryogenic circulation systems have typically limited pressure drop capabilities.

The fluid flow could not easily be reduced to two dimensions since the entrance and exit chambers substantially impact the flow pattern. Therefore a three dimensional model was developed. The model has been developed using the Conjugate Heat Transfer physics in COMSOL Multiphysics 4.3 to simulate the stationary, three dimensional fluid flow and heat transfer. The fluid velocity field was low enough to be assumed as laminar flow. The geometry, thermal field, and fluid flow are assumed to be symmetric to the vertical longitudinal plane for faster computational convergence (GMRES: 240 iterations; Non-linear: 45 iterations).

The properties and equations for the solid copper block are the same as used for the 2-D model. However an additional helium fluid domain is added here. The governing equations, represented in COMSOL, are as follows:

$$\rho(u \cdot \nabla)u = \nabla \cdot [-pI + \mu(\nabla u + (\nabla u)^T) - 2/3\mu(\nabla \cdot u)I] + F \quad (13)$$

$$\nabla \cdot (\rho u) = 0 \quad (14)$$

$$\rho c_p u \cdot \nabla T = \nabla \cdot (k \nabla T) + Q + Q_{vh} + W_p \quad (15)$$

The fluid properties (density, $\rho$, kinematic viscosity, $\mu$, thermal conductivity, k, specific heat, $c_p$) are evaluated at the average working temperature. Laminar flow conditions are assumed consistent with the experimental mass flow rates. The inlet velocity profile is assumed to be parabolic. The fluid enters at a certain pressure and temperature which are set as input boundary conditions for the problem. A symmetric boundary condition is applied to ensure geometric and thermal symmetry.

The meshing is carried out with an aim to keep the computational time as short as possible and yet not affect the results thus obtained. The solid is meshed by a "normal" sized mesh whereas the fluid and its interface with the solid are meshed with a "finer" sized mesh. This amounts to a total of 1.54 million elements taking 156 minutes on a computer with eight CPU cores (2× Intel Xeon X5570) to compute the steady state results. The results are computed using the stationary solvers, which incorporate a GMRES solver and a non-linear solver at default settings. GMRES required 240 iterations and the non-linear solver 45 iterations to arrive at steady state results with temperature field at 100 W heat influx.

CONCLUSION

The simulation results for helium temperature difference and pressure losses in the heat sink closely matched the experimental values under the same input conditions. The copper heat sink device can be efficiently and effectively modeled under the constraints of maximum allowable pressure drop and/or space restrictions. It is thus contemplated that certain embodiments of the current invention are capable of being utilized for optimizing the effects of a heat sink for superconducting power cables and other allied devices. The results further show that unequally spaced fin structure with distance ratios amount to an increase in the heat sink performance.

REFERENCES

[1] T. Shimonosono, S. Nagaya, T. Masuda, and S. Isojima, "Development of a termination for the 77 kV-class high Tc superconducting power cable," *IEEE Trans. Power Del.*, vol. 12, no. 1, pp. 33-38, January 1997.

[2] T. Masuda, H. Yumura, M. Watanabe, H. Takigawa, Y. Ashibe, C. Suzawa, T. Kato, Y. Yamada, K. Sato, S. Isojima, C. Weber, A. Dada, and J. R. Spadafore, "Design and experimental results for Albany HTS cable," *IEEE Trans. Appl. Supercond.*, vol. 15, no. 2, pp. 1806-1809, June 2005.

[3] J. F. Maguire, F. Schmidt, S. Bratt, T. E. Welsh, J. Yuan, A. Allais, and F. Hamber, "Development and demonstration of a HTS power cable to operate in the long island power authority transmission grid," *IEEE Trans. Appl. Supercond.*, vol. 17, no. 2, pp. 2034-2037, June 2007.

[4] J. T. Kephart, B. K. Fitzpatrick, P. Ferrara, M. Pyryt. J. Pienkos, and E. M. Golda, "High temperature superconducting degaussing from feasibility study to fleet adoption," *IEEE Trans. Appl. Supercond.*, vol. 21, no. 3, pp. 2229-2232, June 2011.

[5] S. Manivannan, S. Devi, R. Arumugam, and N. Sudharsan, "Multiobjective optimization of flat plate heat sink using Taguchi-based Grey relational analysis," *Int. J. Adv. Manuf. Technol.*, vol. 52, no. 5-8, pp. 739-749, February 2011.

[6] K. Park, D. Choi, and K. Lee, "Numerical shape optimization for high performance of a heat sink with pin-fins," *Numer. Heat Transf.*, vol. 46, pt. A, no. 9, pp. 909-927, November 2004.

[7] G. Ledezma and A. Bejan, "Heat sinks with sloped plate fins in natural and forced convection," *Int. J. Heat Mass Transf.*, vol. 39, no. 9, pp. 1773-1783, June 1996.

[8] L. Graber, N. G. Suttell, D. Shah, D. G. Crook, C. H. Kim, J. Ordonez, and S. Pamidi, "Cryogenic heat sink for helium gas cooled superconducting power devices," in *Proc. COMSOL Conf.*, Boston, Mass., USA, Oct. 3-5, 2012, pp. 1-10.

[9] R. C. Weast, Ed., *CRC Handbook of Chemistry and Physics*, 6th ed. Boca Raton, Fl., USA: CRC Press, 1988.

[10] V. D. Arp, R. D. McCarty, and D. G. Friend, "Thermophysical properties of helium-4 from 0.8 to 1500 K with pressures to 2000 MPa," NIST. Boulder, Colo., USA, NIST Tech. Note 1334, 1998.

[11] B. A. Hands and V. D. Arp, "A correlation of thermal conductivity data for helium," *Cryogenics*, vol. 21, no. 12, pp. 697-703, December 1981.

[12] R. D. McCarty and V. D. Arp, "A new wide range equation of state for helium," *Adv. Cryogenic Eng.*, vol. 35, pp. 1465-1475. 1990.

[13] F. P. Incropera and D. P. Dewitt, *Fundamentals of Heat and Mass Transfer*. Hoboken, N.J., USA: Wiley, pp. 470-471, 491, 496.

[14] American Society of Heating, Refrigeration and Air Conditioning Engineers, *ASHRAE Handbook of Fundamentals*, New York, N.Y., USA: ASHRAE, 1993.

[15] E. R. G. Eckhert and M. Drake, *Analysis of Heat and Mass Transfer*. Bristol, Pa., USA: Hemisphere, 1987.

[16] N. B. Vargnaftik, *Tables of Thermophysical Properties of Liquids and Gases,* 2nd ed. Bristol, Pa., USA: Hemisphere, 1975.

[17] E. M. Dede, "Experimental investigation of the thermal performance of a manifold hierarchical microchannel cold plate," in *Proc. ASME Conf,* 2011, vol. 59, pp. 59-67.

[18] J. T. Kephart et al., High temperature superconducting degaussing from feasibility study to fleet adoption, IEEE Transactions on Applied Superconductivity, Vol. 21, Issue 3, pp. 2229-2232 (June 2011).

[19] Sastry Pamidi, Chul Han Kim, Jae-Ho Kim, Danny Crook, Steinar Dale, Cryogenic helium gas circulation system for advanced characterization of superconducting cables and other devices, *Cryogenics,* 52, 315-320 (2012).

GLOSSARY OF CLAIM TERMS

Cryogenic gaseous medium: This term is used herein to refer to any element or combination of elements in a gaseous state capable receiving the transfer of heat within a system. Examples include, but are not limited to, helium, hydrogen, neon, and other cryogenic gaseous medium.

Heat conductive material: This term is used herein to refer to any material, typically a metal, that is capable of receiving the transfer of heat within a system. An example is copper.

Heat intercept: This term is used herein to refer to an apparatus according to certain embodiments of the current invention, where the apparatus includes a heat sink, fins affixed within the heat sink, an inlet channel, and an outlet channel. The heat intercept can be coupled to a superconducting system (e.g., high temperature superconducting system) to maintain the designed operating cryogenic temperature range of the system.

Low temperature system: This term is used herein to refer to devices that have enhanced behavior (e.g., superconductivity) at low temperatures (e.g., below 138 K). Examples of compounds that exhibit this behavior include, but are not limited to, yttrium barium copper oxide.

Operating cryogenic temperature range: This term is used herein to refer to the designed range of temperatures values within which the underlying device functions properly. In certain devices, such as low temperature systems (e.g., superconductors), deviating from this range typically renders the system ineffective, potentially causing system failure.

Recirculate: This term is used herein to refer to processing a gaseous composition from the outlet channel for reentry into the inlet channel. During this process, the gaseous composition is cooled, so that upon reentry into the inlet channel and heat sink, the composition can absorb a greater amount of heat.

Temperature-critical aspect: This term is used herein to refer to the part or portion of the low temperature system that experiences heat influx and thus requires cooling or maintaining of an operating temperature range. For example, a temperature-critical aspect of a higher temperature system may be a cable termination at the intersection of a copper conductor and an HTS cable.

Vacuum chamber: This term is used herein to refer to an enclosure from which the air and other gases are removed by a pump, resulting in a low pressure environment therewithin.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of maintaining an operating cryogenic temperature range of a low temperature system, comprising the steps of:
    coupling an attachment surface of a heat intercept to a temperature-critical aspect of said low temperature system, said attachment surface conforming to the shape of said temperature-critical aspect, said attachment surface formed of a heat conductive material,
    said heat intercept including a heat sink, an inlet channel, and an outlet channel, said inlet channel and said outlet channel extending away from said heat sink, said heat sink positioned in abutting relation to said temperature-critical aspect of said low temperature system,
    said heat sink having a first interior with a plurality of fins affixed therewithin, said inlet channel having a second interior, said outlet channel having a third interior,
    said first interior of said heat sink being in open communication with said second interior of said inlet channel, said first interior of said heat sink being in open communication with said third interior of said outlet channel; and
    injecting a cryogenic gaseous medium into said inlet channel, wherein said cryogenic gaseous medium enters said heat sink through said inlet channel and exits said heat sink through said outlet channel,
    wherein said cryogenic gaseous medium has a higher temperature when exiting said heat sink than when entering said heat sink.

2. A method as in claim 1, further comprising:
    said low temperature system being a superconducting power device.

3. A method as in claim 1, further comprising the step of:
    recirculating said cryogenic gaseous medium after exiting said heat sink through said outlet channel, such that said recirculated cryogenic gaseous medium can reenter said heat sink through said inlet channel.

4. A method as in claim 1, further comprising:
    said inlet channel positioned in angled relation to said heat sink, and
    said outlet channel positioned in angled relation to said heat sink.

5. A method as in claim 1, further comprising:
    said heat sink having a first end and a second end, said inlet channel extending from said first end if said heat sink, said outlet channel extending from said second end of said heat sink,
    wherein said inlet channel, said heat sink, and said outlet channel are parallel to one another.

6. A method as in claim 1, further comprising:
    said attachment surface being planar.

7. A method as in claim 1, further comprising:
    said plurality of fins each extending from said attachment surface into said first interior of said heat sink.

8. A method as in claim 1, further comprising:
    positioning a vacuum chamber around said temperature-critical aspect of said low temperature system and said attachment surface of said heat intercept in order to reduce heat transfer from ambient.

9. A method of maintaining an operating cryogenic temperature range of a low temperature superconducting system, comprising the steps of:
    coupling a planar attachment surface of a heat intercept to a temperature-critical aspect of said low temperature system, said attachment surface conforming to the shape of said temperature-critical aspect, said attachment surface formed of a heat conductive material,
    said heat intercept including a heat sink, an inlet channel, and an outlet channel, said inlet channel and said outlet channel extending away from said heat sink, said heat sink positioned in abutting relation to said temperature-critical aspect of said low temperature system,
    said heat sink having a first interior with a plurality of fins affixed to and extending from said attachment surface into said first interior of said heat sink, said inlet channel having a second interior, said outlet channel having a third interior,
    said first interior of said heat sink being in open communication with said second interior of said inlet channel, said first interior of said heat sink being in open communication with said third interior of said outlet channel, said heat sink having a first end and a second end, said inlet channel extending from said first end if said heat sink, said outlet channel extending from said second end of said heat sink, wherein said inlet channel, said heat sink, and said outlet channel are parallel to one another;

injecting a cryogenic gaseous medium into said inlet channel, wherein said cryogenic gaseous medium enters said heat sink through said inlet channel and exits said heat sink through said outlet channel, wherein said cryogenic gaseous medium has a higher temperature when exiting said heat sink than when entering said heat sink; and recirculating said cryogenic gaseous medium after exiting said heat sink through said outlet channel, such that said recirculated cryogenic gaseous medium can reenter said heat sink through said inlet channel.

10. A heat intercept, comprising:

a heat sink having an attachment surface for coupling to a temperature-critical aspect of a low temperature system, said attachment surface having a shape conforming to the shape of said temperature-critical aspect, said attachment surface formed of a heat conductive material, said heat sink further having a first interior and a plurality of fins affixed within said first interior;

an inlet channel coupled to said heat sink and extending away from said heat sink, said inlet channel having a second interior configured for the flow of a cryogenic gaseous medium;

an outlet channel coupled to said heat sink and extending away from said heat sink, said outlet channel having a third interior configured for the flow of said cryogenic gaseous medium, said first interior of said heat sink being in open communication with said second interior of said inlet channel, said first interior of said heat sink being in open communication with said third interior of said outlet channel, wherein said cryogenic gaseous medium enters said heat sink through said inlet channel and exits said heat sink through said outlet channel, wherein said cryogenic gaseous medium has a higher temperature when exiting said heat sink than when entering said heat sink.

11. A heat intercept as in claim 10, further comprising:

said low temperature system being a superconducting power device.

12. A heat intercept as in claim 10, further comprising:

a gas recirculation system coupled to said inlet channel and said outlet channel for receiving said cryogenic gaseous medium from said outlet channel and subsequently recycling and cooling said cryogenic gaseous medium for reentry into said inlet channel.

13. A heat intercept as in claim 10, further comprising:

said inlet channel positioned in angled relation to said heat sink, and said outlet channel positioned in angled relation to said heat sink.

14. A heat intercept as in claim 10, further comprising:

said heat sink having a first end and a second end, said inlet channel extending from said first end if said heat sink, said outlet channel extending from said second end of said heat sink, wherein said inlet channel, said heat sink, and said outlet channel are parallel to one another.

15. A heat intercept as in claim 10, further comprising:

said attachment surface being planar.

16. A heat intercept as in claim 10, further comprising:

said plurality of fins each extending from said attachment surface into said first interior of said heat sink.

17. A heat intercept as in claim 10, further comprising:

a vacuum chamber disposed in surrounding relation to said temperature-critical aspect of said low temperature system and said attachment surface of said heat intercept in order to reduce heat transfer from ambient.

\* \* \* \* \*